United States Patent
Sun et al.

(10) Patent No.: US 8,131,075 B2
(45) Date of Patent: Mar. 6, 2012

(54) FAST 4D SEGMENTATION OF LARGE DATASETS USING GRAPH CUTS

(75) Inventors: Yiyong Sun, Lawrenceville, NJ (US); Herve Jun Alfred Lombaert, Montreal (CA); Farida Cheriet, Montreal (CA)

(73) Assignee: Siemens Aktiengesellschaft, München (DE)

( * ) Notice: Subject to any disclaimer, the term of this patent is extended or adjusted under 35 U.S.C. 154(b) by 1134 days.

(21) Appl. No.: 11/927,777

(22) Filed: Oct. 30, 2007

(65) Prior Publication Data

US 2008/0240564 A1    Oct. 2, 2008

Related U.S. Application Data

(60) Provisional application No. 60/908,740, filed on Mar. 29, 2007.

(51) Int. Cl.
*G06K 9/34* (2006.01)
(52) U.S. Cl. ......... 382/173; 382/128; 382/164; 382/175
(58) Field of Classification Search .................. 382/173, 382/175, 164, 128, 131, 284; 348/E5.059; 345/440, 420, 424; 362/131
See application file for complete search history.

(56) References Cited

U.S. PATENT DOCUMENTS

| | | | | |
|---|---|---|---|---|
| 7,430,339 | B2 * | 9/2008 | Rother et al. | 382/284 |
| 7,548,649 | B2 * | 6/2009 | Cardenas et al. | 382/173 |
| 7,634,123 | B2 * | 12/2009 | Florin et al. | 382/128 |
| 7,702,153 | B2 * | 4/2010 | Hong et al. | 382/173 |
| 7,724,256 | B2 * | 5/2010 | Grady et al. | 345/440 |
| 7,822,274 | B2 * | 10/2010 | Sinop et al. | 382/173 |

\* cited by examiner

*Primary Examiner* — Anh Hong Do

(74) *Attorney, Agent, or Firm* — Donald B. Paschburg; F. Chau & Associates, LLC

(57) ABSTRACT

A method for segmenting at least a pair of regions of an image. High resolution data is obtained of the image. Each one of the pair of the regions in the image is marked. Graph cuts are used on the downsampled data to obtain first voxels along an outer boundary of a selected one of the pair of marked regions and second voxels along an inner boundary the selected region. The graphs cuts are projected to the previously obtained high-resolution image data. First and second sets of seeds are placed on the first voxels and a second set of seeds respectively. The first seeds grow into first areas extending inwardly of the selected region while simultaneously the second seeds grow into second areas extending towards the first extending areas until the first areas and the second areas meet to thereby establish the outer boundary of the selected region.

5 Claims, 2 Drawing Sheets

Seed Points

Graph Cuts

Band Construction

Competitive Region Growing

FAST 4D SEGMENTATION OF LARGE DATASETS USING GRAPH CUTS

CROSS-REFERENCE TO RELATED APPLICATIONS

This application claims priority from U.S. Provisional application Ser. No. 60/908,740 filed Mar. 29, 2007, the entire subject matter thereof being incorporated herein by reference.

TECHNICAL FIELD

This invention relates generally to image segmentation and more particularly to the use of graph cuts to segment regions of an image.

BACKGROUND

As is known in the art, it is frequently desirable to detect and segment an image of an object from a background of other objects and/or from a background of noise. One application, for example, is in CT or MRI where it is desired to segment an anatomical feature of a human patient, such as, for example, a vertebra of the patient. In other cases it would be desirable to segment a moving, deformable anatomical feature such as the heart.

The amount of information contained in medical images can become overwhelming during an intervention. This is even truer when dealing with volume sequences. The time spent in interpreting these images can be greatly decreased with segmentation algorithms, highlighting anatomical structures of interest, thus leading to a better image understanding and organ localization. Spatial images (2D and 3D) have been heavily studied. Spatio-temporal images (4D) are becoming widely available and they still present an unsolved computational challenge. Scanners output gigabytes of data and the trend is towards even higher definitions.

Explicit deformable models have been used as initial attempts for 4D segmentation. Free form deformations and simplex have been applied in the temporal domain to track 3D surfaces over time. However, 4D segmentation is not treated as a whole; the temporal dimension is rather treated separately. The surface of a particular frame serves as an initial guess for the next frame. Temporal correlation has been considered by adding 4D a priori knowledge in the segmentation. A probabilistic 4D atlas has been used and the segmentation is done with the EM algorithm. Temporal constraints have been added in a 4D deformable model.

As is also known, the level set method is a well-established segmentation algorithm in 2D and 3D images. Although this method is easily extendable to N-D, few works have been done in 4D. A 4D levelset has been used to approximate the aortic shape, the surface itself is computed with a graph-based method. Shape priors have been used to improve the segmentation of low quality images.

As is also known in the art, graph cuts have become the leading segmentation method guaranteeing a global optimal solution. It has already been used for 4D surface selection and reconstruction. In image segmentation, although being N-D interactive, Boykov and Jolly's method (Boykov, Y., Jolly, M. P.: Interactive organ segmentation using graph cuts. In: MICCAI, London, UK, Springer-Verlag (2000) 276-286) may be impractical for some 4D medical datasets using current processing capacities. New designs have been proposed to get around this issue. In Xu, N., Bansal, R., Ahuja, N.: Object segmentation using graph cuts based active contours. In: CVPR. Volume 2. (2003) II-46-53 vol. 2, active contours are simulated by evolving banded graph cuts. However, in this method, the band inner boundary has a smaller surface than the band outer boundary; the difference in surface area creates a shrinkage bias. Lazy snapping (Li, Y., Sun, J., Tang, C. K., Shum, H. Y.: Lazy snapping. ACM Trans. Graph. 23(3) (2004) 303-308, Li, Y., Sun, J., Shum, H. Y.: Video object cut and paste. In: IGGRAPH, New York, N.Y., USA, ACM Press (2005) 595-600) uses the graph cuts technique on watershed regions of the image. The algorithm pre-segmentation is however time consuming when using large datasets, and produces an unpredictable number of watershed regions. Moreover, the fine segmentation depends on the watershed boundaries, and as shown in Adams, R., Bischof, L.: Seeded region growing. IEEE Trans on PAMI 16(6) (1994)641-647, these boundaries are not necessarily robust to noise. Rather than watershed regions, the mean shift algorithm has been used in Wang, J., Bhat, P., Colburn, A. R., Agrawala, M., Cohen, M. F.: Interactive video cutout. In: SIGGRAPII, New York, N.Y., USA, ACM Press (2005) 585 594 to segment objects in a (2D+t) video. This method still relies on pre-segmented results, which are also time-consuming in this case. A different coarse-to-fine approach is the multilevel banded graph cuts method (Lombaert, H., Sun, Y., Grady, L., Xu, C.: A multilevel banded graph cuts method for fast image segmentation. In: ICCV, Washington, D.C., USA, IEEE Computer Society (2005) 259-265). The algorithm iteratively projects the results from a coarse image up to the fine resolution. Results in 2D and 3D are comparable to the standard graph cut algorithm. However, small and thin structures can easily be lost with this method when using very large 4D datasets. Active Graph Cuts (Juan, O., Boykov, Y.: Active graph cuts. In: CVPR. Volume 1. (2006) 1023-1029) could solve this problem as it retains the global optimality of the solution, but requires the same amount of memory than the standard graph cuts.

These graph cuts based techniques are all efficient with 2D and 3D images, but the memory required by large 4D datasets is prohibitive. The standard graph cuts method uses a graph where each of its node is associated with a unique voxel. The user initializes the algorithm (FIG. 1A) with seed points belonging to the object and to the background. Representing a 4D graph with all its nodes (V) and edges (E) requires a prohibitive amount of "memory. For example, with Boykov and Kolmogorov's maxflow implementation, 24|V|+14|E| bytes are required. That is over 21 GB for a 4D $10 \times 256^3$ dataset. Additionally, the polynomial complexity makes graph cuts impractical using today's processing power.

SUMMARY

In accordance with the present invention, a method is provided for segmenting at least a pair of regions of an image. The method comprises obtaining high resolution data of the image; marking one of the pair of the regions in the image; using graph cuts on the downsampled data of the image to obtain first voxels along an outer boundary of a selected one of the pair of marked regions and second voxels along an inner boundary the selected region; projecting the graphs cuts to the previously obtained high-resolution image data; placing first and second sets of seeds on the first voxels and a second set of seeds respectively; growing the first seeds into first areas extending inwardly of the selected region while simultaneously the second seeds grow into second areas extending towards the first extending areas until the first areas and the second areas meet to thereby establish the outer boundary of the selected region.

In one embodiment a method for segmenting at least a pair of regions of an image, such method comprising: obtaining relatively high resolution data of the image, such obtained data comprising a plurality of voxels of the image; marking each one of the pair of the regions in the image; downsampling the number of obtained voxels; constructing a graph from the downsampled number of voxels, such graph having a plurality of nodes, each one of the nodes being associated with a corresponding to one of the downsampled number of voxels; using graph cuts, obtain: (a) first voxels along an outer boundary of a portion of the image comprising the ones of the plurality of nodes outside an outer boundary of a selected one of the pair of regions; and (b) second voxels along an inner boundary of the portion of the image comprising the ones of the plurality of nodes inside the outer boundary of the selected one of the pair of regions; projecting the obtained voxels to the previously obtained high resolution image data; placing a first set of seeds on the first voxels and a second set of seeds on the second voxels; growing the first seeds into first areas extending inwardly of the selected one of the regions while simultaneously growing the second seeds to second areas extending towards the first extending areas until the first areas and the second areas meet into thereby establish the outer boundary of the selected one of the regions.

Thus, in order to provide a fast and memory efficient method, a coarse-to-fine strategy. More particularly, to reduce memory requirements, the cut graph is constructed at a lower (i.e., course resolution image). The global shape of a 4D structure is first approximated via graph cuts in a sufficiently coarse image. Once the global shape is known, a band is constructed around the coarse resolution image boundary. Later, this boundary is refined with a competitive region growing between the band inner of the region of interest, i.e., the object, and outer limits of the region of interest.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
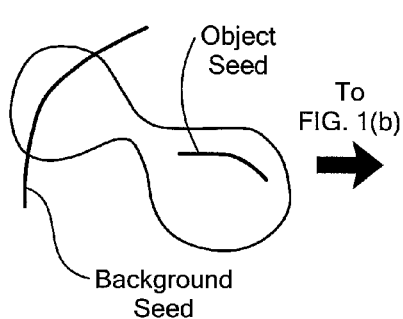
FIG. 1(a) shows an image is having an object and background with user provided marks placed on the object and on the images, such object and image being segmented in accordance with the invention.
Figure 1B:
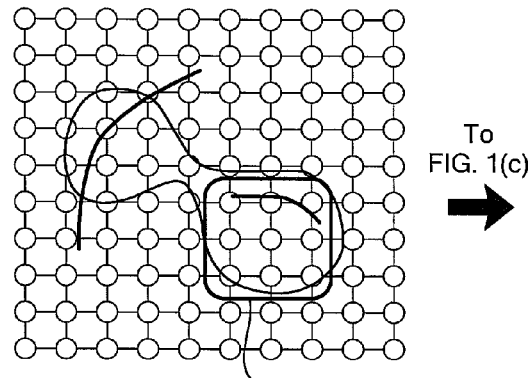
FIG. 1(b) shows the global shape computed with 4D graph cut using high-resolution data of the image of FIG. 1(a)
Figure 1C:
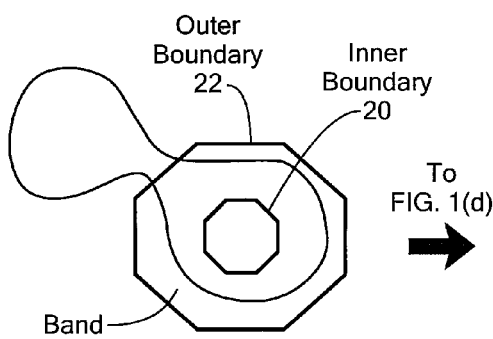
FIG. 1(c) shown a band constructed around the boundary of the object after downsampling the high-resolution data in FIG. 1(b)
Figure 1D:
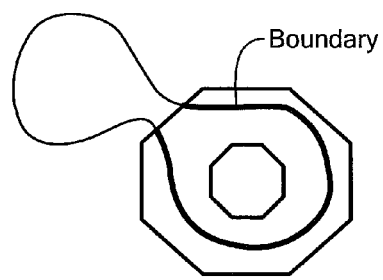
FIG. 1(d) shows the boundary defined (thick black contour) with a fast competitive region growing according to the invention, such region growing being performed after projecting the boundary back into high-resolution data.
Figure 2:
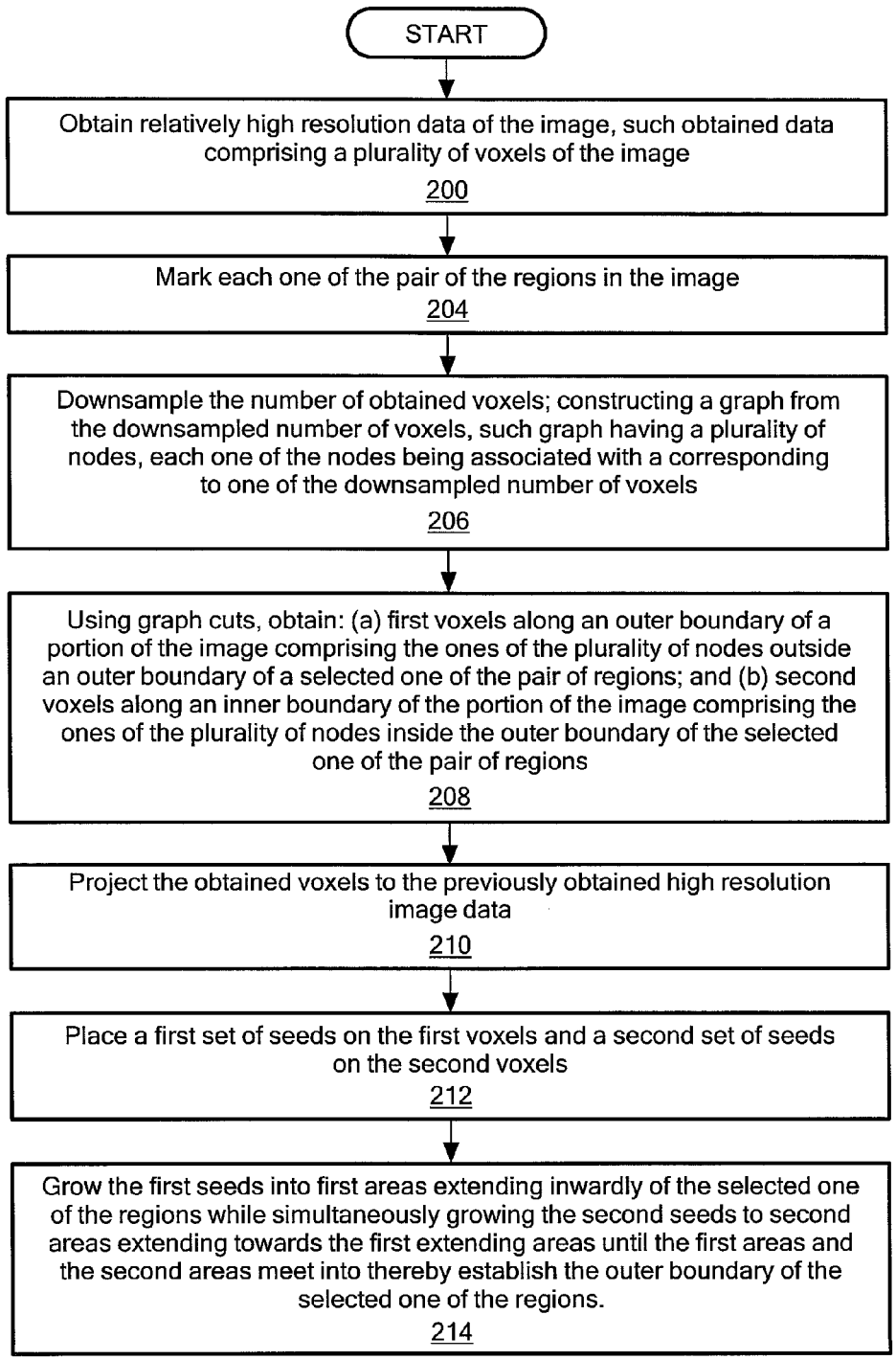
FIG. 2 is a flowchart of the process used for segmenting at least a pair of regions of the shown in FIG. 1(a).

Referring now to FIG. 2, a flowchart of the process used for segmenting at least a pair of regions of an image is shown. Here, in this example, the image is shown in FIG. 1(a). The process obtains relatively high resolution data of the image, such obtained data comprising a plurality of voxels of the image, Step 200. Next, the user marks each one of the pair of the regions in the image as shown in FIG. 1(a). Here one marked region is the object (i.e., the region of interest) and the other marked region is background. Step 202. Next, the process downsamples the number of obtained voxels, as described in more detail below, Step 204. Next, the process constructs a graph from the downsampled number of voxels, such graph having a plurality of nodes as shown in FIG. 1(b), each one of the nodes being associated with a corresponding to one of the downsampled number of voxels, Step 206. Next, the process uses graph cuts, as shown in FIG. 1C, to obtain: (a) first voxels along an outer boundary 20 of a portion of the image comprising the ones of the plurality of nodes outside an outer boundary of a selected one of the pair of regions; and (b) second voxels along an inner boundary 22 of the portion of the image comprising the ones of the plurality of nodes inside the outer boundary of the selected one of the pair of regions, Step 208. Next, the process projects the obtained voxels to the previously obtained high-resolution image data, Step 210. Next, a first set of seeds, initialized by a user, are placed on the first voxels and a second set of seeds, initialized by a user, are placed on the second voxels, Step 212. Finally, the process grows the first seeds into first areas extending inwardly of the selected one of the regions while simultaneously growing the second seeds to second areas extending towards the first extending areas until the first areas and the second areas meet into thereby establish the outer boundary of the selected one of the regions, as shown in FIG. 1D, Step 214.

It should be noted that a heuristic strategy is used to prevent leaking within the band. The boundary could also be iteratively refined by evolving it.

As described above, a coarsening strategy for the 4D data as well as for the seed points is used. They must be scaled down (i.e., downsampled into low resolution data) by a factor k so that the resulting graph fits in the computer s memory. The 4D data has been coarsened with the mean filter followed by a down sampling factor of k. The seed point coordinates are simply scaled down by the factor k. Note that k can be different for each dimension. For instance, temporal resolution is typically lower than spatial resolution, thus, a low scaling factor (e.g., 1) is preferred for the temporal dimension.

In the graph construction, a node p is associated with a low resolution 4D voxel. These nodes are connected with a spatio-temporal neighborhood system N. A voxel can move in all directions between two frames. Therefore, for a better spatio-temporal integrity, the temporal neighborhood can include all direct neighbors in the previous and in the next frame, e.g., $|N^{(t-1)}|=|N^{(t+1)}|=6$. One voxel in low resolution is equivalent to k voxels in high resolution. Thus, temporal connections to the direct neighbors actually handle motion between two frames as large as k voxels.

The cost of a link between nodes p and q is based on the data intensity difference $|I_p-I_q|$. As proposed in Boykov, Y., Jolly, M. P.: Interactive organ segmentation using graph cuts. In: MICCAI, London, UK, Springer-Verlag (2000) 276-286, the cost is $w_{p,q}=f(|I_p-I_q|)$ with $f(x)=e^{x^2}/\sigma$ where $\sigma$ is a smoothness parameter. The cost of the organ boundary in a single 3D frame might he cheaper than the cost of the whole 4D hyper-boundary (Shi, J., Malik, J.: Normalized cuts and image segmentation. IEEE Trans on PAMI 22(8) (2000) 888-905). A proposed solution is to treat temporal neighborhood links differently and make them slightly more expensive. An organ is assumed to be seen on all frames. This is implemented by using a link cost $w_{p,q}=\tau f(|I_p^{(t)}-I_q^{(t+1)}|)$ with $\tau>1$.

Beside neighborhood connections, each node p is also connected to two terminal nodes, "obj" and "bkg". As proposed in Boykov, Y., Jolly, M. P.: Interactive organ segmentation using graph cuts. In: MICCAI, London, UK, Springer-Verlag (2000) 276-286, the seed points on the object (O) and the seedpoints on the background (B) are connected to the terminal nodes with infinity cost links ($w_{p,"obj"}=\infty | p \in O$, and $w_{p,"bkg"}=\infty | p \in B$). Zero cost links are used elsewhere. The minimum cut in the graph will create a binary partition of the graph (FIG. 1B), classifying each node into either object- or background. The uncoarsening process limited to the area where the coarse segmentation is not precise, that is around the graph's minimum cut. A surrounding band is constructed as shown in FIG. 1C. Its radius is ideally the size of one low resolution voxel (k voxels in high resolution). It is assumed that the inner surface of the band remains inside the organ (i.e., inside the object), and that the outer band remains outside it. The strategy of the boundary refinement is competitive region growing between the inner and the outer surfaces within the band. Despite being fast, region growing algorithms are easily prone to leaking. However, leaking is confined in the band, and restrained by the competitive strategy. Note that this refinement takes place in 4D, a hyper-band and hyper-regions are indeed used.

Similarly to the seeded region growing (here using the process described in Adams, R., Bischof, L.: Seeded region growing. IEEE Trans on PAMI 16(6) (1994) 641-647 [20]), all potentially new object or background voxels are placed in one priority queue. Their order in the queue depends on the intensity difference $\text{diff}(p) = |I_p - I_{par(p)}|$ between the candidate voxel p and its parent par(p)

For a newly inserted voxel in the priority queue, its key value key(p) is an integration of previous keys, i.e., key(p) =diff(p)+λkey(par(p)), with λ bounded between 0 and 1. Regions grow first in voxels with similar intensities. When λ>0, this heuristics favors the growing of regions close to the seed points. This parameter simulates the smoothness of the grown boundary.

The refinement step can optionally be an iterative process. For each new iteration, a new band is constructed around the previously refined boundary. This band evolution allows an incremental segmentation of structures not fully present in the initial band (e.g., vessels originating, or ending, in the segmented organ). However, as the competitive region growing does not yield a global optimum result, there is no guarantee of convergence to such an iterative approach.

A method according to an exemplary embodiment of the present disclosure, image data may include one or more frames from an MR volume or CT sequence. An exemplary computer system for performing method steps described herein may be implemented as a CORE 2 DUO 2.8 Ghz processor and 2 GB of memory.

A number of embodiments of the invention have been described. Nevertheless, it will be understood that various modifications may be made without departing from the spirit and scope of the invention. Accordingly, other embodiments are within the scope of the following claims.

What is claimed is:

1. A method for segmenting an image of a heart comprising:
   receiving the image data comprising a plurality of voxels, the image data including first seeds points belonging to the heart and second seeds points belonging a background region;
   downsampling the plurality of voxels of the image data to determine a downsampled set of voxels;
   constructing a graph having a plurality of nodes corresponding to the downsampled set of voxels;
   determining first voxels of the downsampled set of voxels along an outer boundary of the heart and determining, second voxels of the downsampled set of voxels along an inner boundary of the heart;
   projecting the first voxels and the second voxels to the image data;
   scaling down the first set of seeds and the second set of seeds;
   establishing a refined outer boundary of the region of interest by growing the first set of seeds inwardly to define a first area while simultaneously growing the second seeds outwardly to define a second area until the first areas and the second areas meet, to thereby establish and display the refined outer boundary of the heart.

2. The method of claim 1, wherein the refined outer boundary defines a segmentation of the heart.

3. The method of claim 1, wherein the downsampling of the plurality of voxels and the scaling down of the first set of seeds and second set of seeds is by a common factor k.

4. The method of claim 1, wherein the refined outer boundary is established iteratively.

5. The method of claim 4, further comprising:
   constructing a band around the refined outer boundary at each iteration of the region growth of the first area and the second area; and
   determining an incremental segmentation of the heart for at least one iteration.

* * * * *